(12) United States Patent
Meckesheimer et al.

(10) Patent No.: US 12,322,077 B2
(45) Date of Patent: Jun. 3, 2025

(54) SYSTEMS AND METHODS FOR CONTAINER CONDITION DETERMINATION IN TRANSPORT REFRIGIRATION

(71) Applicant: Carrier Corporation, Palm Beach Gardens, FL (US)

(72) Inventors: Martin Meckesheimer, Haarlem (NL); Jeffrey Allen Leshuk, Davis, CA (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 436 days.

(21) Appl. No.: 17/661,916

(22) Filed: May 3, 2022

(65) Prior Publication Data

US 2022/0366556 A1 Nov. 17, 2022

Related U.S. Application Data

(60) Provisional application No. 63/201,840, filed on May 14, 2021.

(51) Int. Cl.
*G06T 7/00* (2017.01)
*F25D 29/00* (2006.01)
(Continued)

(52) U.S. Cl.
CPC .......... *G06T 7/0002* (2013.01); *F25D 29/003* (2013.01); *G06Q 10/0832* (2013.01);
(Continued)

(58) Field of Classification Search
CPC ......... G06T 7/0004; G06T 2207/30128; G06T 7/0002; G06T 7/70; G06T 2207/20076;
(Continued)

(56) References Cited

U.S. PATENT DOCUMENTS 9,189,661 B1 * 11/2015 Meyers ............... G06K 19/0723
10,024,563 B2 * 7/2018 Nakamoto ............... F24F 11/79
(Continued)

FOREIGN PATENT DOCUMENTS

| EP | 11071502 A2 | 6/2001 |
| WO | 2016093873 A1 | 6/2016 |
| WO | 2016146887 A1 | 9/2016 |

OTHER PUBLICATIONS

Extended European Search Report received for EP Application No. 22173357.9, mailed on Jun. 9, 2022, 5 Pages.
(Continued)

*Primary Examiner* — Kathleen Y Dulaney
(74) *Attorney, Agent, or Firm* — Drew Folgmann

(57) ABSTRACT

Systems and methods for container condition determination are disclosed. In some embodiments, a system comprises one or more optical sensors; at least one processor; and memory storing instructions executable by the at least one processor, the instructions when executed cause the system to: obtain image data of a container from the one or more optical sensors; determine from the image data, position information of one or more items located inside the container; determine from the image data air delivery information in the container; determine airflow characteristics of the container using the position information of the one or more items and the air delivery information; and determine, using the airflow characteristics and the position information of the one or more items, a probability of an item of the one or more items being damaged.

20 Claims, 12 Drawing Sheets

(51) Int. Cl.
*G06Q 10/0832* (2023.01)
*G06T 7/70* (2017.01)

(52) U.S. Cl.
CPC ............ *G06T 7/70* (2017.01); *F25D 2700/06* (2013.01); *G06T 2207/20076* (2013.01)

(58) Field of Classification Search
CPC ..... B60R 2011/0003; B60R 2300/8006; F25D 29/00; F25D 29/003; F25D 2700/06; G06V 20/59; G06V 20/00; G06V 10/22; G06Q 10/0832; G06Q 10/0833; G06F 30/28; G06F 2113/08; G06F 2119/08
USPC .......................................... 382/100; 700/300
See application file for complete search history.

(56) References Cited

U.S. PATENT DOCUMENTS

| | | | |
|---|---|---|---|
| 10,867,275 | B1 | 12/2020 | Dholakia |
| 2008/0270076 | A1 | 10/2008 | Breed |
| 2008/0316324 | A1 | 12/2008 | Rofougaran et al. |
| 2009/0248218 | A1* | 10/2009 | Dyrmose ............... F25D 29/003 700/300 |
| 2014/0168370 | A1 | 6/2014 | Heidemann et al. |
| 2016/0042321 | A1 | 2/2016 | Held |
| 2016/0047646 | A1* | 2/2016 | Ochsendorf ......... G01C 21/343 348/148 |
| 2016/0238406 | A1* | 8/2016 | Burtner .................. G06F 16/22 |
| 2016/0260059 | A1* | 9/2016 | Benjamin .......... G06Q 10/0833 |
| 2016/0277715 | A1* | 9/2016 | Mankovskii .............. G06T 7/55 |
| 2016/0297361 | A1* | 10/2016 | Drazan ..................... B60R 1/26 |
| 2016/0379367 | A1 | 12/2016 | Yasunaga |
| 2018/0014427 | A1 | 1/2018 | VanGilder |
| 2018/0082249 | A1 | 3/2018 | High et al. |
| 2018/0197139 | A1* | 7/2018 | Hill .................... G06Q 10/0832 |
| 2019/0223324 | A1 | 7/2019 | Le et al. |
| 2019/0236510 | A1* | 8/2019 | Kwak .................... G07C 5/008 |
| 2020/0218296 | A1* | 7/2020 | Tiwari ................. G06Q 10/087 |
| 2021/0215377 | A1* | 7/2021 | Kitagawa ............. F24F 11/0001 |
| 2022/0057425 | A1* | 2/2022 | Koike ....................... G01P 5/02 |

OTHER PUBLICATIONS

Grudzielanek a Martina et al: "Capturing Cold-Air Flow Using Thermal Imaging", Boundary Layer Meteorology, Reidel, Dordrecht, NL, vol. 157, No. 2, Jun. 4, 2015 (Jun. 4, 2015), pp. 321-332, XP035538835, ISSN: 0006-8314, DOI: 10.1007/S10546-015-0042-8 * abstract *.

Cogoport: "A Guide to Shipping in Refrigerated Containers (Reefers)", Aug. 12, 2020 (Aug. 12, 2020), XP055954943, Retrieved from the Internet: URL:https://www.cogoport.com/blogs/a-complete-guide-to-shipping-in-refrigerated-containers-reefers [retrieved on Aug. 25, 2022] * abstract *.

Klever Steffen et al: "A first step towards automated image-based container inspections", Proceedings of the Hamburg International Conference of Logistics (HICL), Jan. 1, 2020 (Jan. 1, 2020), pp. 427-456, XP055954939, DOI: 10.15480/882.3122ISBN: 978-3-7531-2346-2Retrieved from the Internet: URL:https://www.econstor.eu/bitstream/1041 9/228929/1/hicl-2020-29-427.pdf.

Che Jiahang et al: A Comprehensive Solution for Deep-Learning Based Cargo Inspection to Discriminate Goods in Containers 11 2018 IEEE/CVF Conference on Computer Vision and Pattern Recognition Workshops (CVPRW), IEEE, Jun. 18, 2018 (Jun. 18, 2018), pp. 1287-12877, XP033475462, DOI: 10.1109/CVPRW.2018.00166 [retrieved on Dec. 13, 2018] * abstract *.

* cited by examiner

SYSTEMS AND METHODS FOR CONTAINER CONDITION DETERMINATION IN TRANSPORT REFRIGIRATION

CROSS REFERENCE TO A RELATED APPLICATION

The application claims the benefit of U.S. Provisional Application No. 63/201,840 filed May 14, 2021, the contents of which are hereby incorporated in their entirety

BACKGROUND

The invention relates generally to transport refrigeration and, more specifically, to container condition determination in transport refrigeration.

Computer models have been used to create simulations of thermal behavior of refrigerated shipments of perishables on a limited project basis for many years. The use of such models on a routine operational basis may not be practical due to the difficulty of efficiently obtaining inputs needed to ensure that simulations utilizing such models are accurate.

BRIEF DESCRIPTION

Aspects of the disclosure relate to methods, apparatuses, and/or systems for container condition determination.

In some embodiments, a system for container condition determination comprises one or more optical sensors; at least one processor; and memory storing instructions executable by the at least one processor, the instructions when executed cause the system to: obtain image data of a container from the one or more optical sensors; determine from the image data, position information of one or more items located inside the container; determine from the image data air delivery information in the container; determine airflow characteristics of the container using the position information of the one or more items and the air delivery information; and determine, using the airflow characteristics and the position information of the one or more items, a probability of an item of the one or more items being damaged.

In some embodiments, the system is configured to determine a condition of one or more components of the container based on the image data of the container, the condition of the one or more components indicating presence or absence of damage to the one or more components; and determine a condition of the container based on condition of the one or more components.

In some embodiments, the system is configured to determine a loading pattern of the container based on the position information of one or more items located inside the container.

In some embodiments, the system is configured to obtain, from sensors placed inside the container, environmental information inside the container; and determine a temperature control performance in the container based on the obtained environmental information; such that determining the probability of the item being damaged is further based on the environmental information or the temperature control performance.

In some embodiments, the system is configured to determine thermal information for the container based on the image data; and generate one or more of a thermal simulation, an airflow simulation, or a loading pattern simulation based on one or more of the thermal, airflow, or loading information.

In some embodiments, a method for container condition determination, the method being implemented in system comprising one or more optical sensors, at least one processor, and memory storing instructions. The method comprises: obtaining image data of a container from the one or more optical sensors; determining from the image data, position information of one or more items located inside the container; determining from the image data air delivery information in the container; determining airflow characteristics of the container using the position information of the one or more items and the air delivery information; and determining, using the airflow characteristics and the position information of the one or more items, a probability of an item of the one or more items being damaged.

In some embodiments, a non-transitory computer-readable storage medium storing program instructions computer-executable to implement: obtaining image data of a container from the one or more optical sensors; determining from the image data, position information of one or more items located inside the container; determining from the image data air delivery information in the container; determining airflow characteristics of the container using the position information of the one or more items and the air delivery information; determining, using the airflow characteristics and the position information of the one or more items, a probability of an item of the one or more items being damaged.

Various other aspects, features, and advantages of the invention will be apparent through the detailed description of the invention and the drawings attached hereto. It is also to be understood that both the foregoing general description and the following detailed description are examples and not restrictive of the scope of the invention.

DETAILED DESCRIPTION

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1:
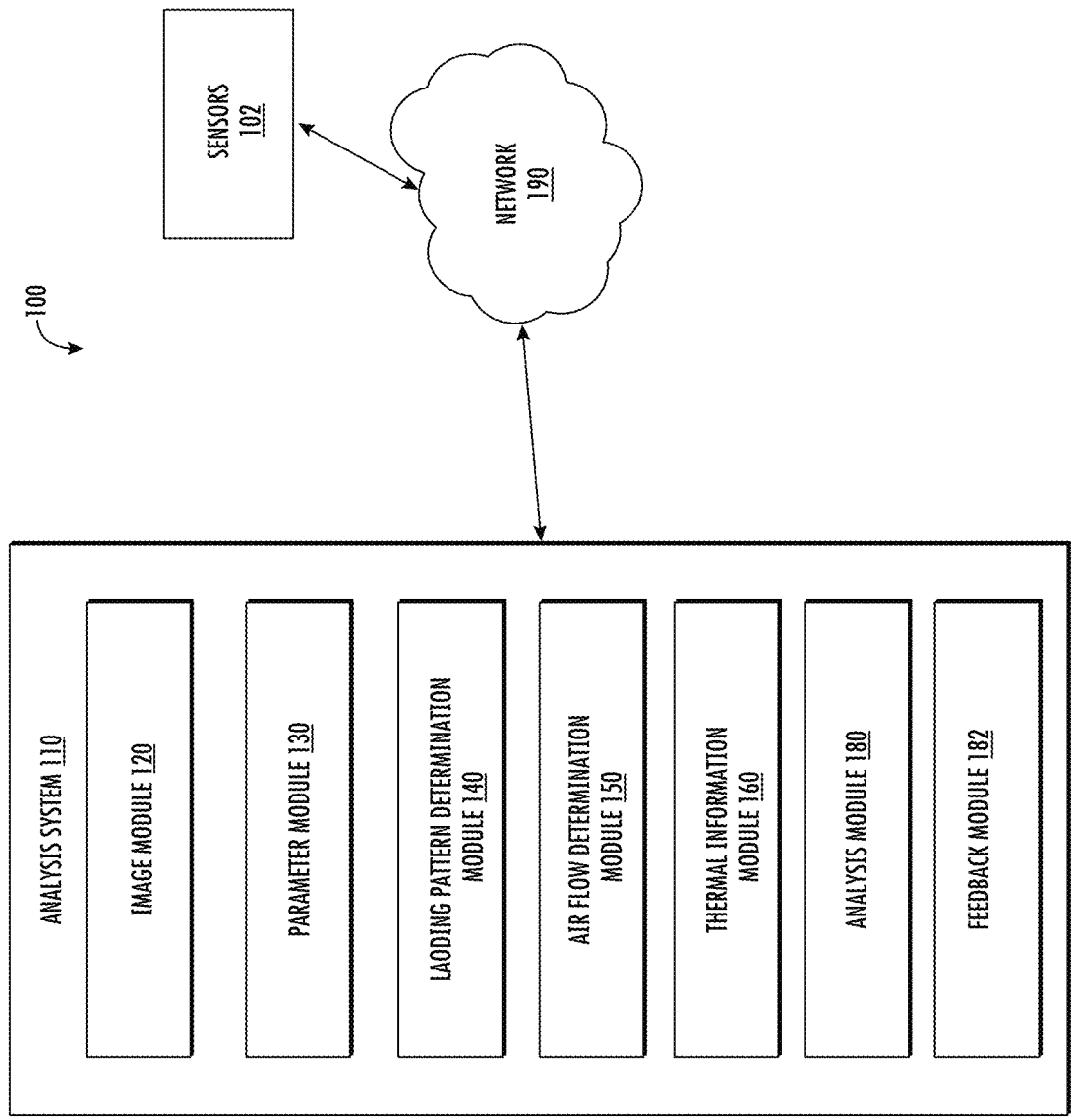
FIG. 1 shows an example of a system for container condition determination, in accordance with one or more embodiments.

FIG. 1 shows an example of a system 100 for container condition determination, in accordance with one or more embodiments. In some embodiments, system 100 may be configured to automatically capture, interpret, analyze and report information related to shipping containers and details of shipments utilizing the captured information. In some embodiments, system 100 may provide simulations and visualizations of shipments which may facilitate both assessment of individual shipments and process improvement activities. System 100 may include analysis system 110, one or more sensors 102, and/or other components. Other components known to one of ordinary skill in the art may be included in system 100 to gather, process, transmit, receive, acquire, and provide information used in conjunction with the disclosed embodiments. In addition, system 100 may further include other components that perform or assist in the performance of one or more processes that are consistent with disclosed embodiments.

In some embodiments system 100 may include a network 190 connecting one or more components of system 100. In some embodiments, networks 190 may be any type of network configured to provide communications between components of system 100. For example, network 190 may be any type of network (including infrastructure) that provides communications, exchanges information, and/or facilitates the exchange of information, such as the Internet, a Local Area Network, near field communication (NFC), optical code scanner, cellular network, text messaging systems (e.g., SMS, MMS), frequency (RF) link, Bluetooth®, Wi-Fi, or other suitable connections that enables the sending and receiving of information between the components of system 100. It will be appreciated that this is not intended to be limiting and that the scope of this disclosure includes implementations in which the client one or more components of system 100 are operatively linked via some other communication media.

In some embodiments, analysis system 110 comprises an image module 120, a parameter module 130, an airflow determination module 150, a thermal information module 160, a loading pattern module 170, analysis module 180, feedback module 182, and/or other components. In some embodiments, analysis system 110 may include computing resources such as processors and memory devices for storing instructions (e.g., computing system 900 described herein below with reference to FIG. 9). The processors may be configured to execute software instructions to perform various operations of system 100. The computing resources may include software instructions to perform operations of modules 110, 120, 130, 150, 160, 170, 180, 182, and/or other components of system 100.

Image module 120 may be configured to obtain image data of the container, container components, and/or cargo content. A "container" may refer to shipping containers, trailers, intermodal shipping containers, marine containers, trucks, and/or other receptacle that can be used to store and/or transport goods by road, rail, air or sea. The container may be refrigerated or non-refrigerated. "Cargo content" and "cargo items" refer to items located inside the container, items to be loaded (placed) inside the container, and/or items unloaded (removed) from the container.

In some embodiments, the one or more image data may be of inside the container, outside the container and/or surrounding area. In some embodiments, the image data may be obtained from sensors 102, an image database, and/or other database located withing or outside of system 100. Sensors 102 are configured to generate output signals conveying information related to the container, container components, and/or cargo content. Sensors 102 may include one or more of optical sensors, an image or video camera, thermographic sensor, a depth sensor, a scanner, a LIDAR sensor, a RADAR sensor, a 3D camera, an infrared light sensor, a hyperspectral imager, multispectral imager, and/or other sensors. In some embodiments, sensor data obtained from sensors 102 may be processed (e.g., using processors 910 described herein with reference to FIG. 9) to extract image information. In some embodiments, the sensor data obtained by sensors 102 may include images, videos, multi-dimensional depth images, thermal images, infrared light measurements, light reflection time measurements, radio wave measurements, range, angle, and/or other sensor data. In some embodiments, a plurality of sensor data from a plurality of sensors of sensors 102 may be combined to extract the information. For example, images from different locations and angles, multi-dimensional depth images, thermal images, ranges, angles, and/or other image data obtained from sensors 102 may be combined to provide information about the container, a container component, or particular cargo item.

In some embodiments, sensors 102 may be positioned at any locations that allows sensor measurements of the container, container components, and the cargo items. For example, one or more sensors of sensors 102 may be located at a receiving dock, loading dock, container doors, loading area, storage area, on a machine for loading cargo content (e.g., forklift, etc.)

In some embodiments, parameter module 130 is configured to obtain one or more parameters related to the container, and/or cargo items. In some embodiments, parameter module 130 may be configured to extract information from data image obtained from sensors 102 (e.g., to detect, identify, or determine position and orientation of objects on the image data). In some embodiments, parameter module 130 may extract information by comparing the image data with images from an image database. In some embodiments, image data may be processed using computer vision techniques to detect, identify, or determine position or orientation. For example, image data may be combined, filtered, and processed to identify an object (e.g., container, container components, and/or cargo items). Once identified, the object may be measured, and its position and orientation extracted.

For example, in some embodiments, parameter module 130 may be configured to process the image data using key frame extraction techniques to determine which frames to be used for evaluation. For example, in some embodiments, parameter module 130 may be configured to filter the image data based on one or more of motion detection, object detection, image quality, etc. For example, in some embodiments, parameter module 130 may be configured to use frames without a predetermined level of movement, and/or without a specific object (e.g., forklift image, human image, or other objects in the image). In some embodiments, parameter module 130 may be configured to use monocular depth measurement techniques (e.g., perspective cues) to locate proper guidelines and/or calculate depth. For example, visual gradient may be used to locate guidelines, product edges, trailer head, and/or other information.

In some embodiments, parameter module 130 may include a machine learning system to extract information from image data of the container. The machine learning system may use one or more of supervised learning, semi-supervised, unsupervised learning, reinforcement learning, and/or other machine learning techniques). In some embodiments, the machine learning models may include decision trees, support vector machines, regression analysis, Bayesian networks, random forest learning, dimensionality reduction algorithms, boosting algorithms, artificial neural networks (e.g., fully connected neural networks, deep convolutional neural networks, or recurrent neural networks), deep learning, and/or other machine learning models.

Parameter module 130 may be configured to determine one or more container parameters based on the output signals from sensors 102 (e.g., image data). For example, parameter module 130 may detect, locate, or determine presence of the container in the vicinity of sensors 102 (e.g., in receiving dock). Container parameters may include position information, identifying information, container components information, and/or other container parameters.

In some embodiments, container position information may include physical position of the container in relation with the receiving dock (e.g., approaching, leaving, docked), in relation with other containers/vehicles in the area, or in relation with the container general surroundings. For example, parameter module 130 may determine if the container is properly/improperly docked (e.g., by measuring clearance), or may provide guidance in the docking process. In some embodiments, identifying information may include dimensions, size, shape, operator, manufacturer, make, model, ID number, a logo, reefer manufacturer, reefer model, reefer ID, and/or any other identifying information of the container. In some embodiments, as described above, the identifying information may be extracted from sensors 102 (e.g., thru image and text processing), and/or database information.

Figure 2:
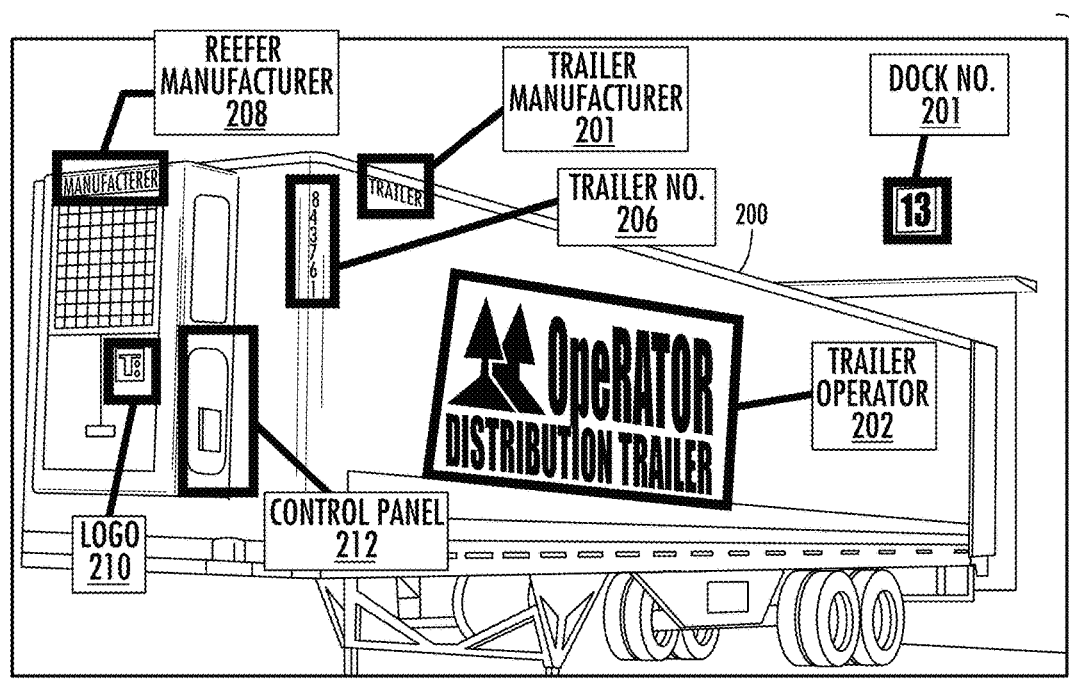
FIG. 2 shows an example operation by the system for container condition determination, in accordance with one or more embodiments.
Figure 2:
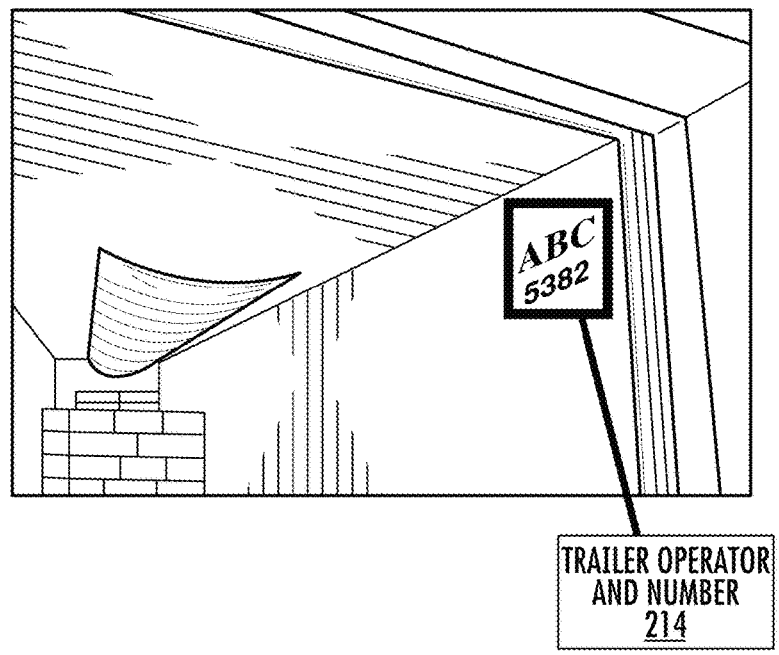

FIG. 2 shows an example operation by the system 100 for container condition determination, in accordance with one or more embodiments. Parameter module 130 is configured to determine identifying information of the trailer. For example, as shown in FIG. 2 identifying information determined by parameter module 130 includes location of trailer (dock No. 201), trailer operator 202, trailer manufacturer 204, trailer number 206, Reefer manufacturer 208, Logo 210, control panel 212, trailer operator and number 214 (obtained from inside the trailer). In some embodiments, one or more characteristic features may be used to identify a container, a refrigeration unit, a manufacturer, or a model (e.g., grill pattern, trim type, etc.). This may be used in cases where the name, logo, or identifying information is not legible or not available.

In some embodiments, parameter module 130 is configured to determine a configuration of the container. In some embodiments, determining a configuration of the container includes identify one or more components of the container (e.g., determining presence, type, location, and/or number of one or more components of the container). The components of the container may include one or of back or side doors, air chutes, ceiling, bulkhead, rails, shelves, walls, skid plates, floors, points of air delivery, refrigeration unit, empty space, sensors, and/or other components of the container. In some embodiments, determining container parameters may include determining air delivery information in the container based on the image data. For example, parameter module may be configured to detect air delivery points inside the container. In some embodiments, the air delivery information may include one or more of a location, number of the air delivery points, type of air delivery, and or other information air delivery information inside the container.

In some embodiments, parameter module 130 may determine a condition (e.g., physical, thermal, or other condition) of the container or one of the container components using the output signals from sensors 102. In some embodiments, the container condition may be determined based on the container parameters (described above). For example, parameter module 130 may evaluate condition of one or more of the components of the container (walls, ceiling, bulkhead, floors, doors, air chutes, refrigeration unit, air delivery points, and/or other components of the container).

In some embodiments, parameter module 130 may determine seal conditions of the container or detect thermal leakage based on image data from sensors 102 (e.g., from thermal images). In some embodiments, evaluating condition of the components may include determining presence/absence of damage to the components, determining a probability of the components being damaged, and/or predicting damage to the components. In some embodiments, parameter module 130 may determine a condition of the container based on condition of its components.

Figure 3:
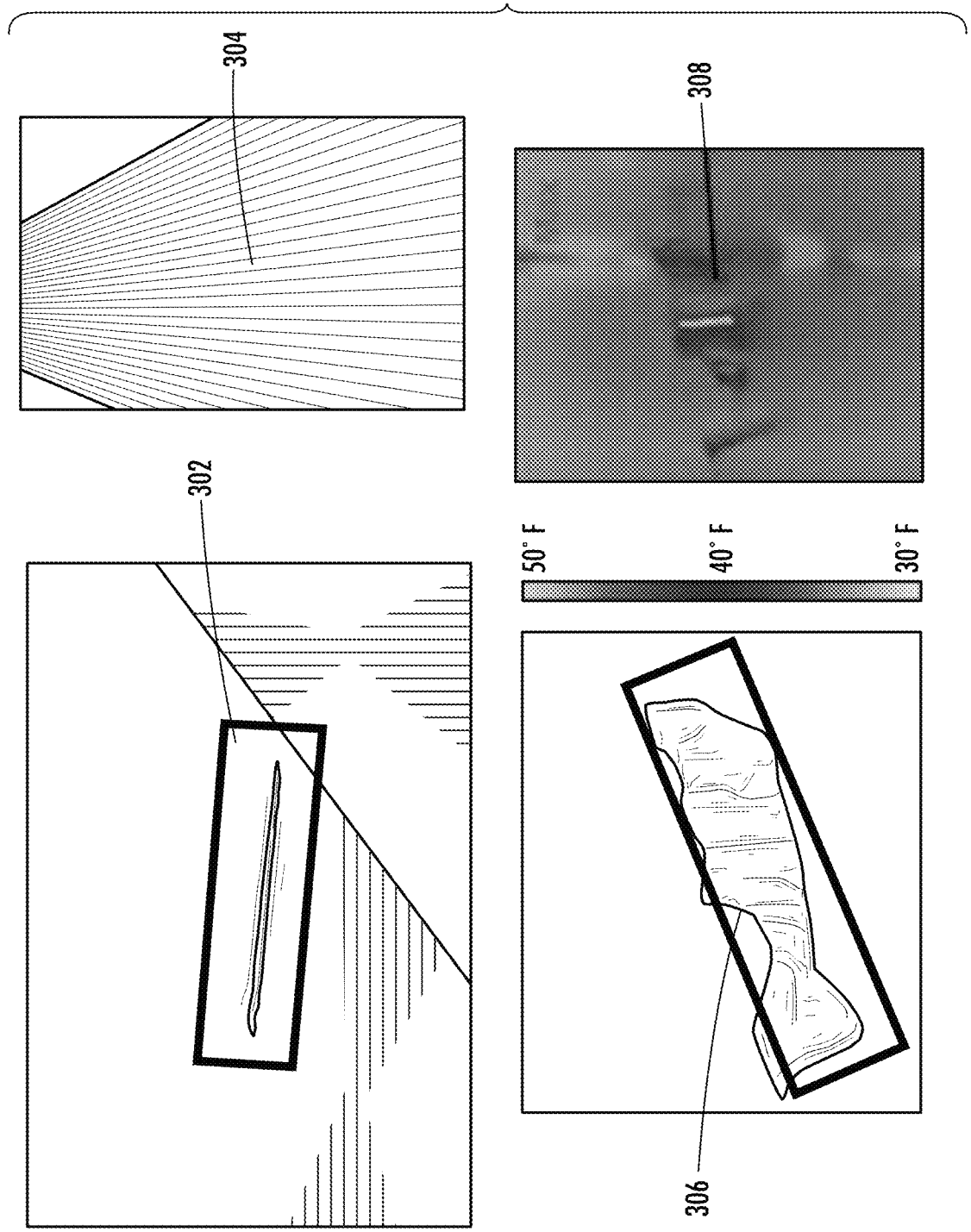
FIG. 3 shows an example operation by the system for container condition determination, in accordance with one or more embodiments.
Figure 4:
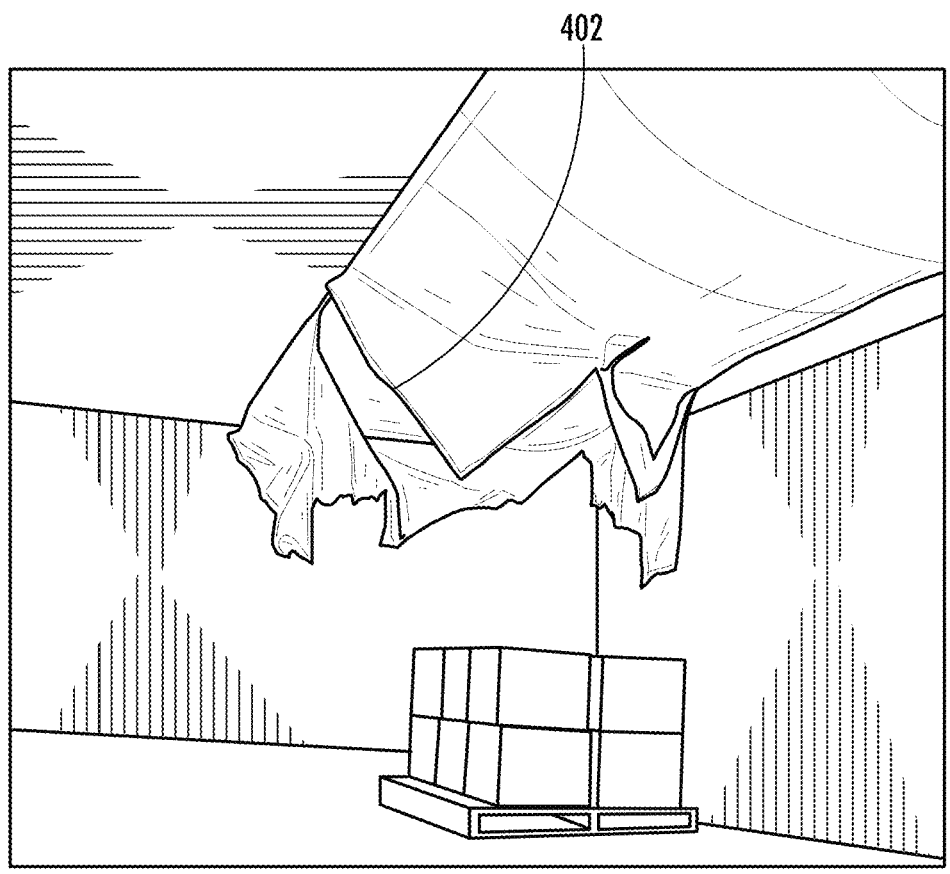
FIG. 4 shows an example operation by the system for container condition determination, in accordance with one or more embodiments.
Figure 4:
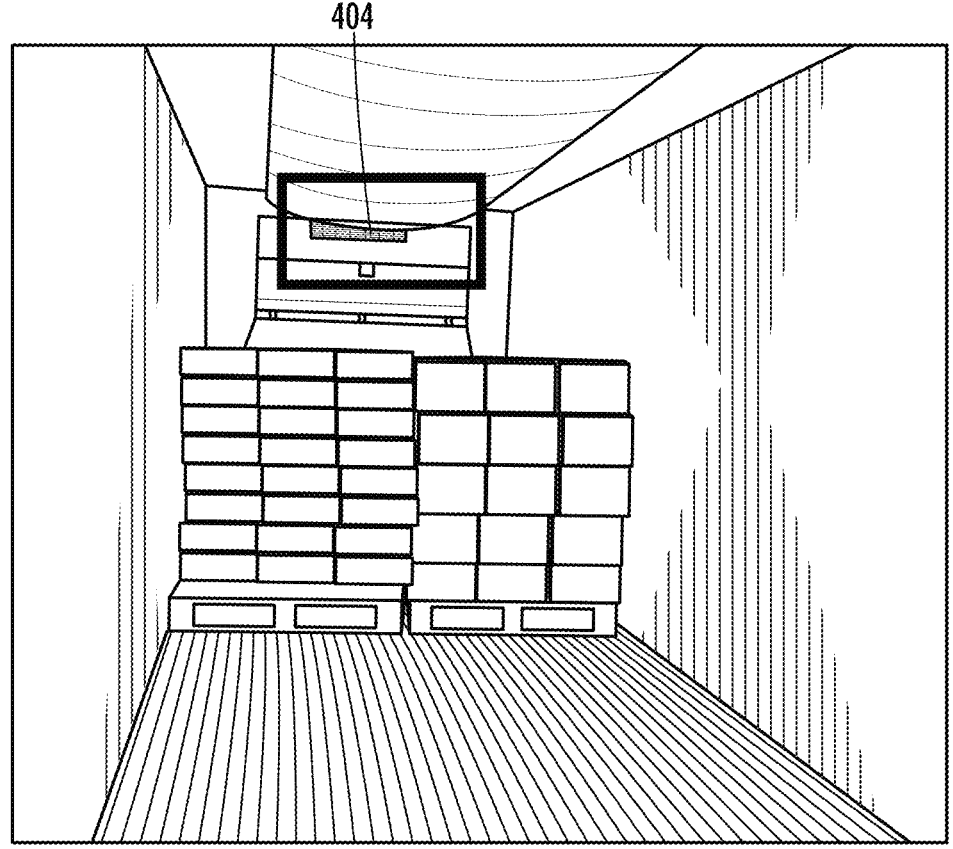

FIG. 3 shows an example operation by the system 100 for container condition determination, in accordance with one or more embodiments. For example, parameter module 130 may be configured to determine condition of the trailer based on detected damages by sensors 102. The detected damages include damage 302 to the ceiling of the trailer, debris 304 on the floor of the trailer, damage 306 to the wall, and thermal leakage 308 caused by damage 306 to the wall. FIG. 4 shows another example operation by the system 100 for container condition determination, in accordance with one or more embodiments. Parameter module 130 may detect that air chute 402 is torn and that air chute 404 is not properly attached. This information may be used to determine a condition of the trailer.

Returning to FIG. 1, in some embodiments, parameter module 130 may be configured to determine one or more cargo items parameters. For example, parameters module 130 may detect, locate, or determine that there are items inside the container using the output signals from sensors 102. Parameter module 130 may be configured to determine cargo items parameters based on the image data. Cargo items parameters may include, position information, identifying information and/or other cargo items parameters.

In some embodiments, position information of an item may include physical position inside the container, rotational orientation of the item, height of the item, and/or information indicating position. In some embodiments, parameter module 130 is configured to determine a position of a cargo item with reference to other cargo items and/or components of the container. For example, parameter module 130 may determine a position of a cargo item inside the container based on a distance between the cargo item and a component of the container (e.g., distance from a wall, roof, back, door, corner, air chute, reefer, air delivery point, and/or other components of the container). In some cases, the position may be determined based on the distance between the item and other items in the cargo. In some embodiments, position information may indicate that an item is adjacent to, below, above, against, on top of, or any relational position with respect to another cargo item or a component of the container. In some embodiments, the positional information may indicate arrangement of cargo items. For example, items are arranged in rows, stacked up on top of each other, located towards one portion of the container versus another portion (e.g., majority of items are towards the back of the container), disposed at an angle of a wall (or back, side, roof, etc.), disposed arbitrarily in the container, and/or arrangement information. In some embodiments, parameter module 130 may determine usage (or presence) of dunnage (e.g., any material used to keep cargo items in position) in the container. Parameter module 130 may determine size, shape, and/or construction of the dunnage.

In some embodiments, parameter module 130 may identify one or more cargo items based on the output signals of sensors 102. In some embodiments, parameter module 130 may determine one or more of a type, brand, size, shape, dimensions, weight, destination, special instructions (fragile, heavy, keep refrigerated, don't stack, expiration date, or other item specific instructions). Some of the identifying information may be extracted by sensors 102 scanning text printed on the item, a bar code, a QR code, a link, a Logo, or other identifying information on the item.

Loading pattern determination module 140 is configured to determine one or more loading characteristics (or loading pattern) of the container based on information from parameter module 130 (e.g., container parameters and/or cargo items parameters). For example, in some embodiments, the loading characteristics may be determined based on the container information (e.g., size, dimensions, shape, etc.), container components (presence and location of the components), and/or cargo items information (e.g., position of the cargo items inside the container, space between items/pallets.) For example, the loading pattern may indicate type of loading (e.g., centerline/wall loading, proximity to doors/walls), loading heights (e.g., pallet heights or stack heights), usage of dunnage, amount and location of empty space, cargo items count, and/or other loading characteristics. For example, in some embodiments, loading pattern determination module 140 may be configured to determine if pallets are touching doors/walls; if there is space between pallets at center; if pallet top exceeds a predetermined height; if pallet top touches (compresses) air chute; if load locks are present; if a height mark is present; if environmental sensors present inside the container; and/or other loading patterns.

In some embodiments, loading pattern module determination 140 may be configured to determine the loading characteristics using the output signals from the sensors (e.g., using computer vison to determine the loading pattern without going through the step of determining the parameters of the cargo items). In some embodiments, the loading characteristics may be compared to historical loading information, loading information from similar containers, best practices loading information, and/or other reference loading information to determine a loading pattern for the container.

Figure 5:
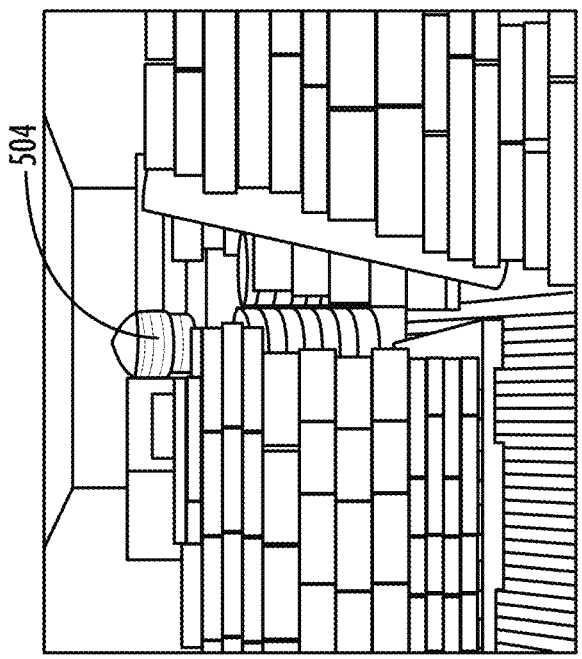
FIG. 5 shows an example operation by the system for container condition determination, in accordance with one or more embodiments.
Figure 5:
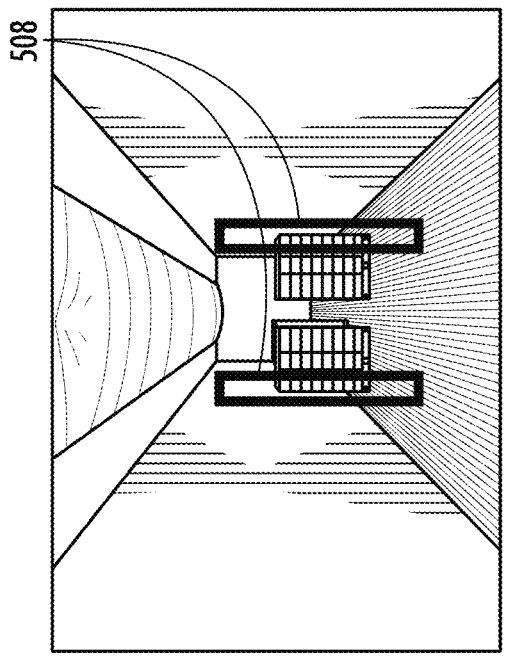
Figure 5:
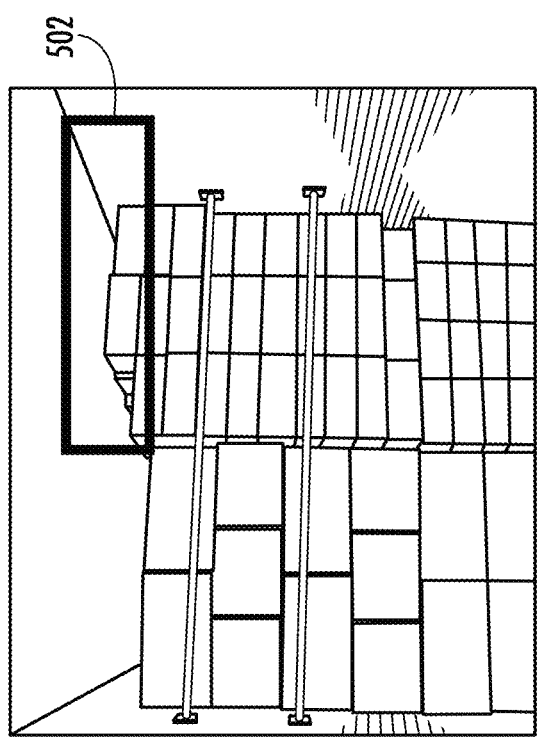
Figure 5:
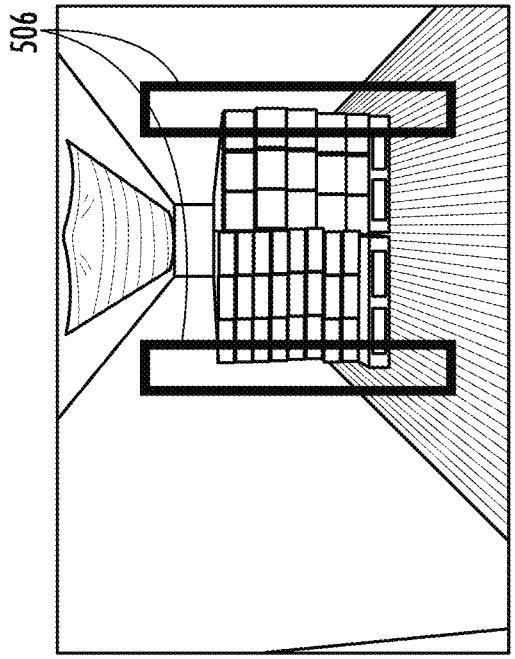

FIG. 5 shows an example operation by the system 100 for container condition determination, in accordance with one or more embodiments. Loading pattern module determination 140 may be configured to determine loading height 502, use of dunnage 504, type of loading 506 (centerline loading) and 508 (wall loading) of cargo items in the trailer. In this case, for example, loading pattern module determination 140 may determine that loading height 502 is too high.

In some embodiments, airflow determination module 150 may be configured to determine environmental information inside the container based on the image data. The environmental information may include air flow information, temperature information, air pressure, humidity, and/or other environmental information. In some embodiments, airflow determination module 150 may be configured to determine airflow characteristics inside the container. Airflow characteristics inside the container may be determined using information obtained from parameter module 130 (e.g., container parameters, cargo content parameters, container condition, etc.). Airflow characteristics inside the container may be determined based on the type, model, or size of the container. In some embodiments, airflow inside the container may be determined based on air delivery points and their location, cargo items and their position, container components, and/or condition of the container. For example, condition of the container (e.g., presence of damage, debris, or thermal leakage) may affect airflow inside the container. Placement of the cargo items (e.g., distance from walls, roof, or each other) may affect airflow inside the container. Dimensions of the container, amount of empty space in the container, location and/or obstruction of refrigeration unit and air delivery points may affect the airflow inside the container. Any combination of information from parameter module 130 module may be used to determine airflow inside the container. In some embodiments, airflow inside the container may be given in a form of a measurement (e.g., 1/s, ft3/min, kg/s, air change/h, or equivalent measurements). In some embodiments, airflow determination module may determine, an airflow index, air flow quality index, airflow loss, and/or other airflow characteristics.

Thermal information module 160 may be configured to determine thermal information inside the container. For example, in some embodiments, temperature of one or more items for the cargo items, temperature, and/or humidity inside the container may be extracted from the output signals of sensors 102. In some embodiments, thermal information module 160 may detect thermal leakage, or areas in the container where temperatures are unusually high or low. For example, thermal parameters may be extracted from thermographic camera image data and compared with reference thermal parameters to determine thermal conditions inside the trailer. In some embodiments, the environmental information may be determined based on the airflow characteristics, and/or the thermal information obtained from airflow determination module 150 and thermal information module 160.

Analysis module 180 is configured to analyze data obtained from image module 120, parameter module 130, loading pattern determination module 140, airflow determination module 150, and/or thermal information module 160 to determine a status of the container, components of the container, cargo items, airflow, thermal information, loading pattern, and/or the other obtained parameters. In some embodiments, determining a status includes determining a probability, or a prediction of the status based on the obtained information. For example, analysis module 180 may determine a probability of damage to the container (or its components), or to cargo items based on analysis of the obtained data. In some embodiments, a status may be determined by comparing reference parameters (e.g., obtained for a reference database) with current parameters. The reference parameters may be based on historical data related to the item and or the container, or data from similar items/containers. In some embodiments, analysis module 180 may be configured to assign a score to the container, cargo items, air flow, thermal information, loading pattern, and/or the other obtained parameters based on the comparison (e.g., the closest the current parameters are to the reference parameters the higher the score is and vice versa). In some embodiments, analysis module 180 may determine a status (e.g., good, bad, fair, damaged, etc.) responsive the score reaching, meeting or exceeding an item score threshold.

For example, analysis module 180 may be configured to determine cargo items integrity. For example, integrity of a pallet or a box or other cargo items may be determined based on a determination of a position/orientation of the item relative to the floor or ceiling of the container. For example, analysis module 180 may be configured to determine that a pallet (or box) is damaged if the pallet is at a degree less than perpendicular to the floor.

In some embodiments, analysis module 180 may determine status of one or more items of the cargo items (e.g., good, bad, damaged, packaging integrity, etc.). The status of an item may be determined based on one or more of cargo items parameters, container parameters, airflow, thermal information, loading pattern, and/or other parameters. For example, in some embodiments, analysis module 180 may determine a probability of an item of the one or more cargo items being damaged based on the airflow characteristics and the position information of the one or more items. In some embodiments, analysis module 180 may be configured to obtain, from sensors placed inside the container, environmental information inside the container. Analysis module 180 may determine a temperature control performance in the container based on the obtained environmental information. In some embodiments, analysis module 180 may be configured to determine the probability of an item being damaged based on the environmental information from the sensors inside the container or the temperature control performance. In some embodiments, analysis module 180 may be configured to estimate water loss from one or more cargo items (e.g., fresh produce) based on information (e.g., humidity measurement) from the sensors inside the container, thermal information, airflow information, or the temperature control performance in the container.

Figure 6:
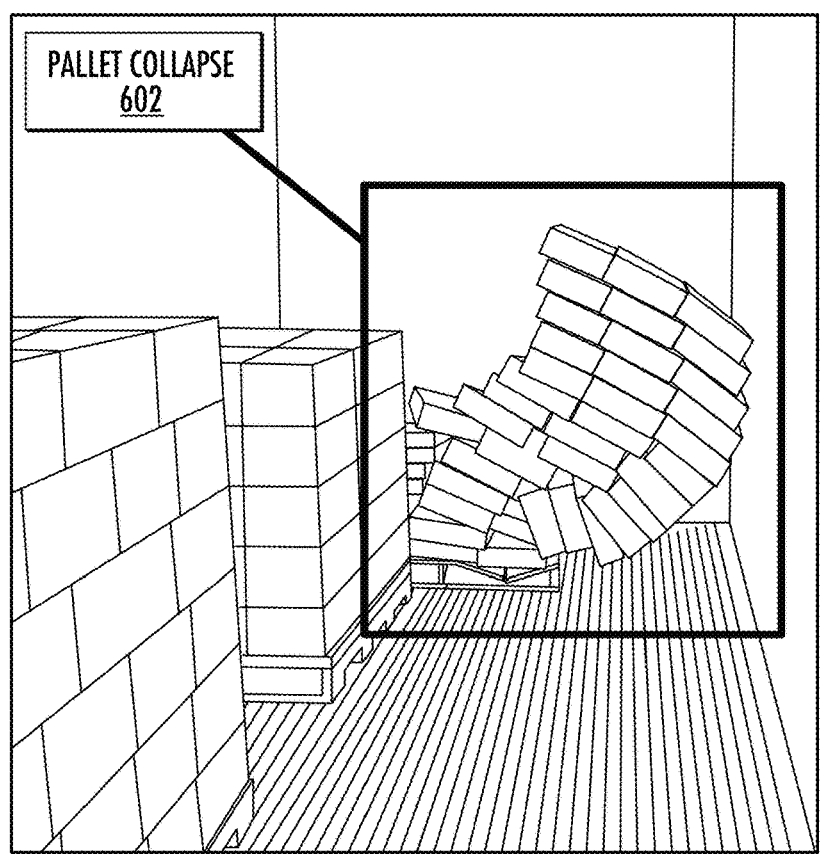
FIG. 6 shows an example operation by the system for container condition determination, in accordance with one or more embodiments.
Figure 6:
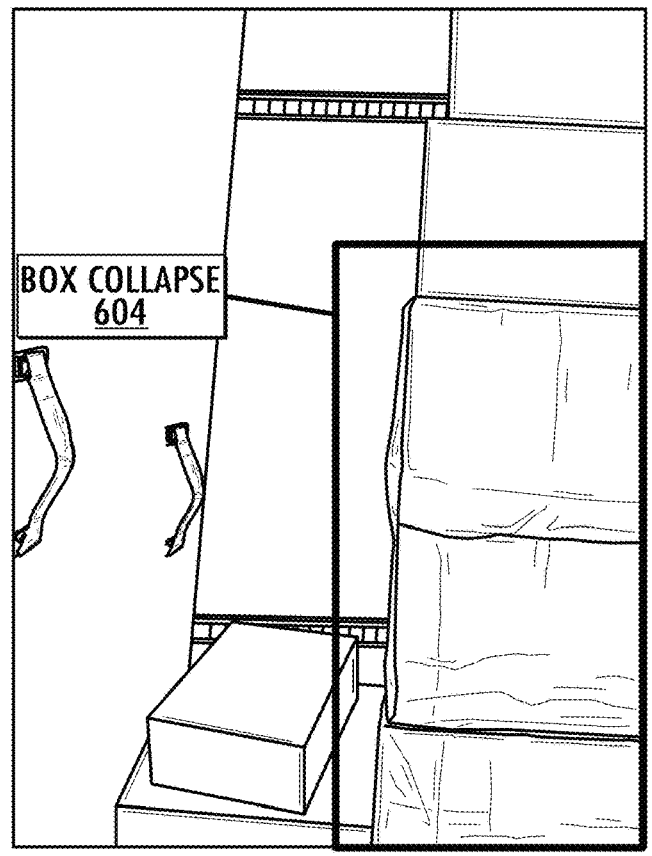
Figure 7A:
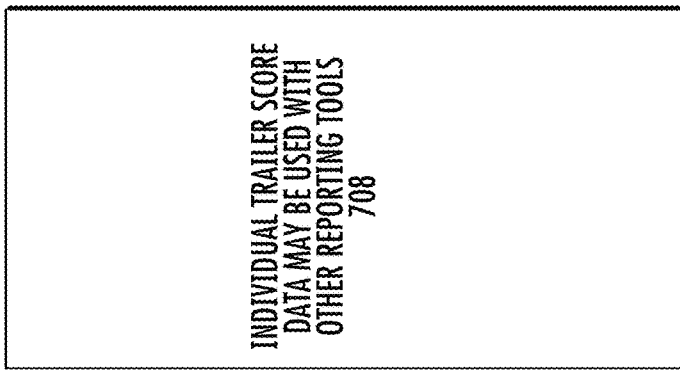
FIGS. 7A-D show examples of operation by the system for container condition determination, in accordance with one or more embodiments.
Figure 7A:
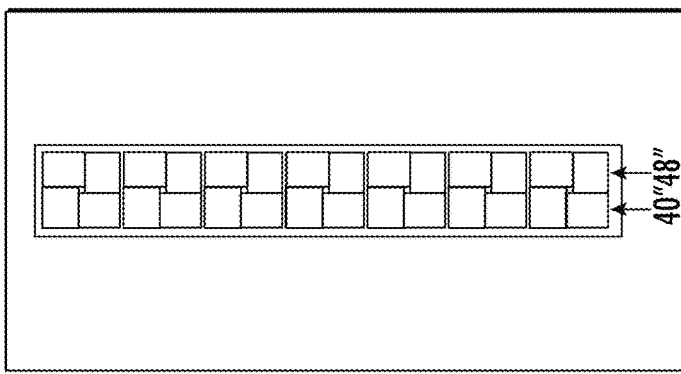
Figure 7A:
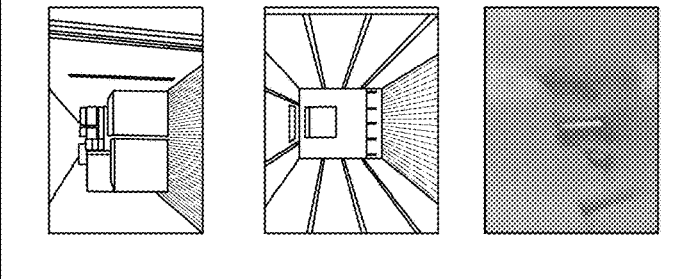
Figure 7B:
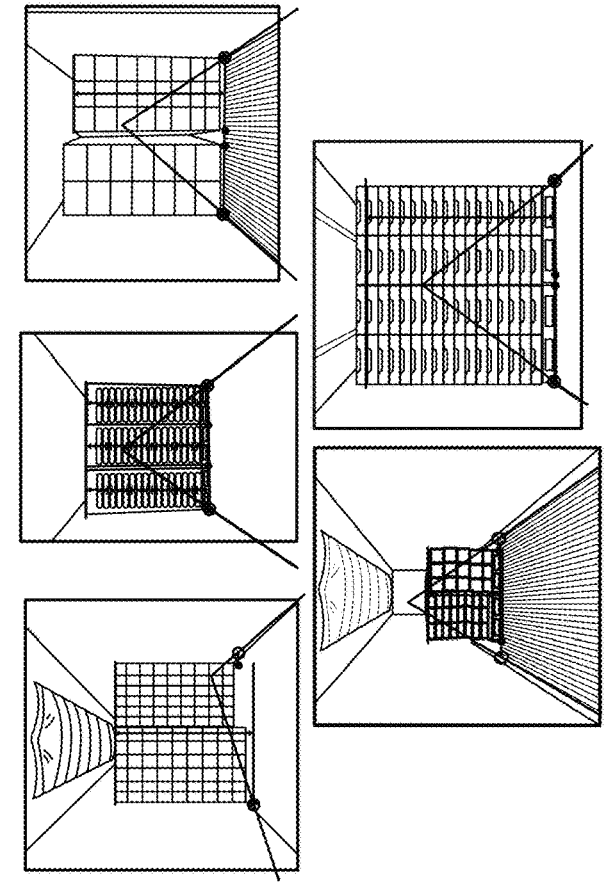
Figure 7C:
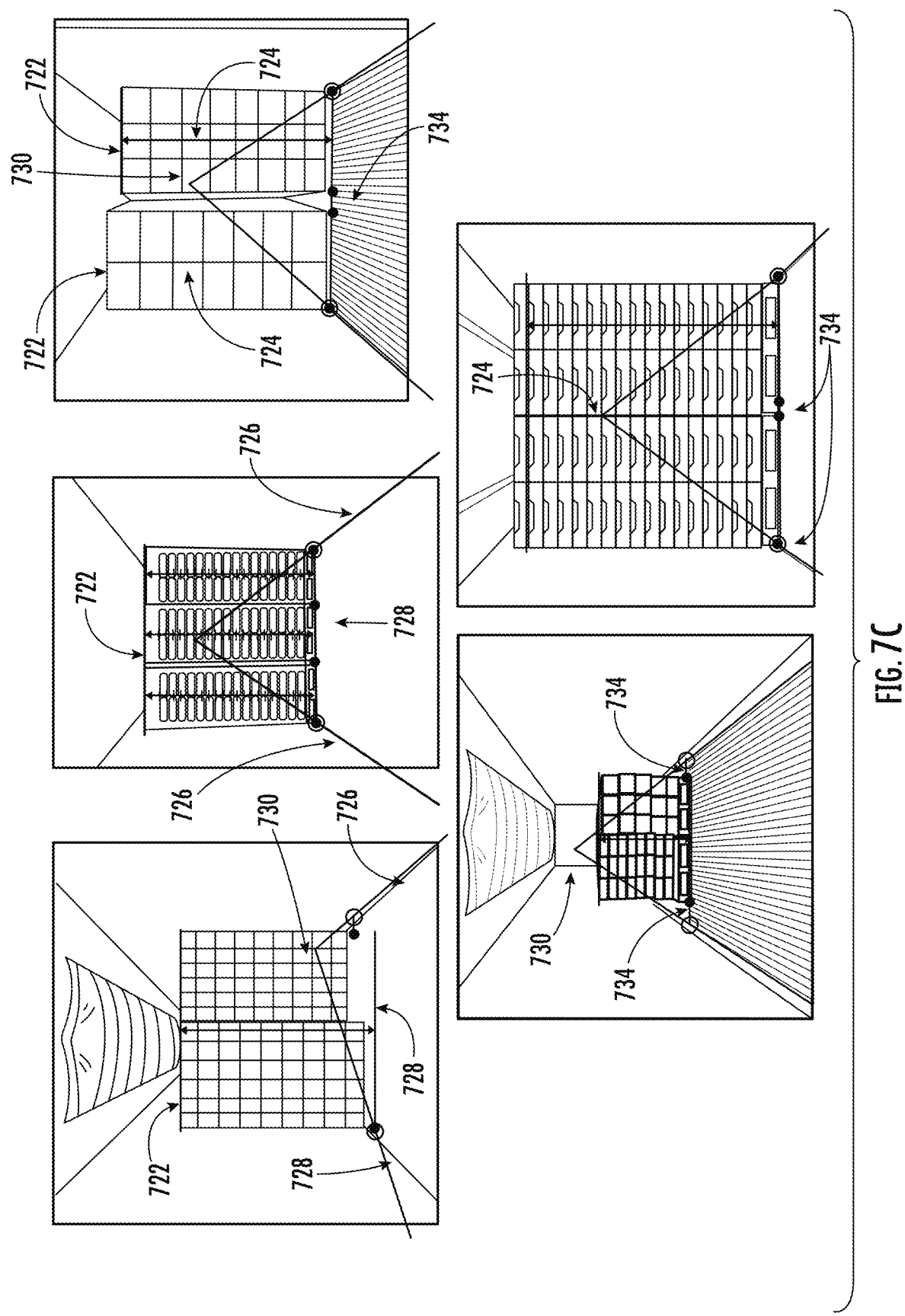
Figure 7D:
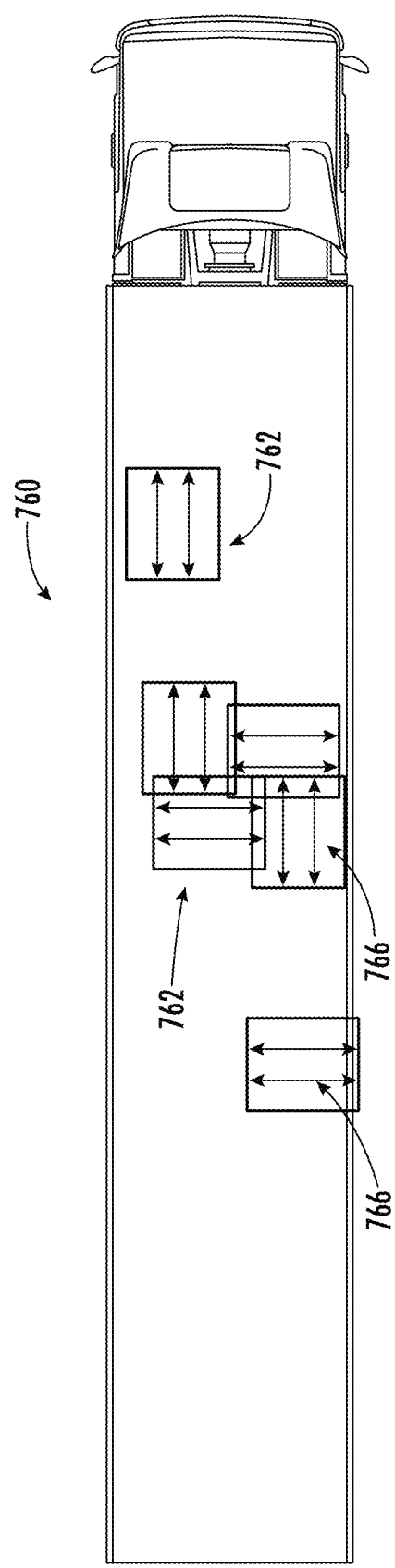

The status of the item may be determined by comparing reference parameters with current parameters related to the item. The reference parameters may be based on historical data related to the item and/or the container, or data from similar items/containers. In some embodiments, analysis module 180 may be configured to assign an item score to the item based on the comparison (e.g., the closest the condition parameters are to the reference condition parameters the higher the score is and vice versa). In some embodiments, analysis module 180 may determine a probability of status of the item (e.g., good, bad, fair, damaged, etc.) responsive the score reaching, meeting or exceeding an item score threshold. FIG. 6 shows an example operation by the system 100 container condition determination, in accordance with one or more embodiments. Analysis module 180 may detect that a cargo item collapsed (pallet collapse 602, or box collapse 604) based on the image data received from image module 120. In some embodiments, analysis module 180 may be configured to determine a probability of damage to the collapsed box 604, and/or damage to a box in the collapsed pallet 602.

In some embodiments, analysis module 180 may be configured to assign parameter scores to one or more of the determined parameters. For example, in some embodiments, analysis module 180 may assign an airflow, loading pattern, thermal, and/or other parameter score. In some embodiments, the parameter score may be based on comparison of reference parameters with the current parameters. For example, a loading pattern score may be determined based on a comparison of a reference loading pattern with the determined loading pattern (e.g., from loading pattern determination module 140). In some embodiments, the closest the loading pattern is to the loading pattern reference the higher the score is and vice versa. In some embodiments, analysis 180 may characterize the loading pattern (e.g., good, bad, fair, etc.) responsive the loading pattern score reaching, meeting, or exceeding a loading pattern score threshold.

Similarly, analysis module 180 may assign an airflow score. In some embodiments, the airflow score may be based on comparison of an airflow reference with the determined airflow (e.g., from airflow determination module 150). In some embodiments, the closest the airflow is to the airflow reference the higher the score is and vice versa. In some embodiments, analysis module 180 may determine a status the airflow (e.g., good, bad, fair, etc.) responsive the airflow score reaching, meeting, or exceeding an airflow score threshold. Further, analysis module 180 may assign a thermal score. In some embodiments, the thermal score may be based on comparison of a thermal reference with the determined thermal information (e.g., from thermal information module 160). In some embodiments, the closest the thermal parameter is to the thermal reference the higher the score is and vice versa. In some embodiments, analysis module 180 may characterize the thermal parameter (e.g., good, bad, fair, etc.) responsive the thermal score reaching, meeting, or exceeding a thermal score threshold. It should be appreciated that examples of status determination described herein are to be taken as examples of embodiments for illustration purposes only. Other techniques of analysis and status determination are contemplated within the present disclosure. For example, in some embodiments, one or more parameter status (including the score) may be based on other parameters' status. In other words, one parameter's status may affect other parameters' status. For example, if a cargo item inside the container scores low, then the loading pattern, thermal parameters, or airflow may score low.

In some embodiments, analysis module 180 may use machine learning techniques to determine status and/or assigning a score. For example, one or more parameters may be input in a machine learning system to train a plurality of models to determine the status or to assign a score. The machine learning system may use any combination of parameters to train the models. For example, in some cases, it may only use image data. In some embodiments, one or more of image data, identifying information, positional information, container information, container components information, airflow, thermal information, loading pattern, and/or other parameters may be used to train the models. The machine learning system may use one or more of supervised learning, semi-supervised, unsupervised learning, reinforcement learning, and/or other machine learning techniques). In some embodiments, the machine learning models may include decision trees, support vector machines, regression analysis, Bayesian networks, random forest learning, dimensionality reduction algorithms, boosting algorithms, artificial neural networks (e.g., fully connected neural networks, deep convolutional neural networks, or recurrent neural networks), deep learning, and/or other machine learning models.

Analysis module 180, in some embodiments, may be configured to determine a container status and/or score. For example, the container status and/or score may indicate an overall condition of the container. In some embodiments, the container status and/or score may be determined based on the one or more parameters (thermal parameter, airflow parameter, loading pattern, item parameter, etc.). In some embodiments, the container status and/or score may be determined based on the parameter scores. For example, the container score may be an aggregate score of the parameter scores. In some embodiments, the scores may be weighted before being used in calculating the container score. In some embodiments, analysis module 180 may be configured to create one or more simulations for the container. For example, analysis module 180 may use the thermal parameters to create a thermal simulation for the container. Similarly, airflow parameters may be used to create an airflow simulation, and/or the loading pattern may be used to create a loading simulation of the container. In some embodiments, the one or more simulations may be displayed for visualization by the user. In some embodiments, the one or more simulations may be combined in one container simulation that can be displayed for the user.

In some embodiments, feedback module 182 may be configured to provide a feedback and or recommendation based on the one or more determined parameters, status, and/or scores. For example, feedback module 182 may provide the feedback and/or recommendation by comparing information from the container and historical information related to the container or to similar containers, or best practices in the industry. In some embodiments, the feedback may include one or more of obtained parameters and scores (e.g., 702 shown in FIG. 7-A), selected images from image data (e.g., select images 704 shown in FIG. 7), loading pattern diagram (e.g., 706 shown in FIG. 7-A), and/or overall container score (obtained parameters and scores (e.g., 708 shown in FIG. 7-A).

In some embodiments, the feedback may indicate cargo items or cargo components that may need the user attention. For example, the user may receive an alert/feedback after the container is open and before unloading, the feedback indicating that an item may me damaged. The feedback may provide the type of item, its location inside the container, type of damage, probability of damage, cause of damage, and/or recommended action, etc. In some embodiments, the feedback may include recommendation to repair one or more components of the container (or the whole container) based on the on the one or more determined parameters, status, and/or scores.

For example, the feedback may indicate that a box of bananas, located in pallet No. 4 may be damaged (e.g., crushed). The feedback may include a display of a container simulation that shows the exact location of the item. In other examples, the feedback may include a notification that one of the air chutes became disconnected and that the items on that side of the container may need additional inspection. In yet another example, the feedback may indicate poor airflow in the container. In this case, the feedback may include a cause of the poor airflow (e.g., loading pattern, obstruction of air delivery point, etc.), and recommend course of action (e.g., repair components of the container, check items in pallets 2-3, check air delivery points, change future loading pattern, etc.)

In some embodiments, feedback module 182 may be configured to compare information obtained from sensors 102 with sensor measurements obtained from sensors inside the container (e.g., item sensors, positional sensors, environmental sensors, or other sensors placed inside the container). In some embodiments, feedback module 182 may indicate discrepancies between the measurements from sensors inside the container and measurements from sensors 102. Feedback provided by feedback module 182 may indicate the discrepancies (difference) between the measurements, a cause for the discrepancies, and/or possible course of action to minimize the discrepancies. For example, the feedback may indicate that a sensor is defective and recommends replacement, or that a sensor is obstructed and recommends changing location of the sensor or changing the loading pattern, etc.

In some embodiments, the feedback module 182 may be configured to adjust a future loading pattern for the container. The future loading pattern may be adjusted (or updated) based on data from the analysis module 180 (e.g., based on the loading pattern score, container score, or the other scores). In some embodiments, the feedback module 182 may be configured to optimize the loading pattern based a comparison of the current loading pattern with best practices for similar containers. In some cases, the feedback module 182 may recommend type of cargo items for future loading plans. For example, feedback module 182 may determine that the container is not suitable for shipping extra cold cargo items and recommends other types of cargo items that may still be shipped in the container in its current condition. In some embodiments, the recommendations may be in the form of a set of choices, and as the user navigates the choices, the feedback module guides the user for the optimal recommendation given the choices the user made (e.g., if the user chooses not to fix a wall damage, then one of the recommendations would be to ship nonperishable items).

In some embodiments feedback module 182 may configured to generate a visual feedback. For example, in some embodiments, airflow characteristics, thermal parameters, and/or loading pattern may be input into a modeling system to generate a visual simulation of one or more of these parameters. In some embodiments, the visual feedback may include a thermal simulation (showing thermal properties of the container or the cargo items), an airflow simulation (showing airflow inside the container), a loading pattern simulation (showing the current loading pattern of the container), and/or other models. In some embodiments, these simulations may be combined into a container simulation and provided as a visual feedback for the user.

FIGS. 7A-D show examples of visual feedbacks according to one or more embodiments of the present disclosure. For example, FIG. 7-B shows an example of user interface 710 including a visual feedback. As can be seen, the feedback may include one or more scores (712). For example, in some embodiments, the feedback may include an overall score (84.5%), a trailer characteristics score (87.5%), a trailer condition score (75%), a trailer loading score (100%), etc.

In some embodiments, the visual feedback may include one or more image data 714. FIG. 7-C shows an example of image data included in the visual feedback (user interface). The image data may include one or more image data analysis. For example, guidelines and depth indicator 726 and 730 (based on perspective locating techniques) 730, height indicator 722, height measurements 724, and distance measurements 734 (e.g., distance between pallets, and/or distance from the walls). In some embodiments, the visual feedback may include a visualization of the trailer. FIG. 7-D shows an example of a trailer 760 according to one or more embodiments. Visualization 760 may include position 762 of the items inside the trailer (e.g., pallets), and/or orientation 766 of the items. It is to be understood that the examples of visual feedback (or user interface) shown in FIGS. 7 A-D are for illustration purposes only. Other information may be included. For example, one or more information shown in FIGS. 1-6 may be included in the visual feedback. In some embodiments, the visual feedback may show actual measurements (e.g., height, distance, orientation, size, etc.). The measurements may be in alpha-numeric format and may be in any measurement units.

It should be appreciated that the illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g., within a data center or geographically), or otherwise differently organized. The functionality described herein may be provided by one or more processors of one or more computers executing code stored on a tangible, non-transitory, machine readable medium.

Figure 8:
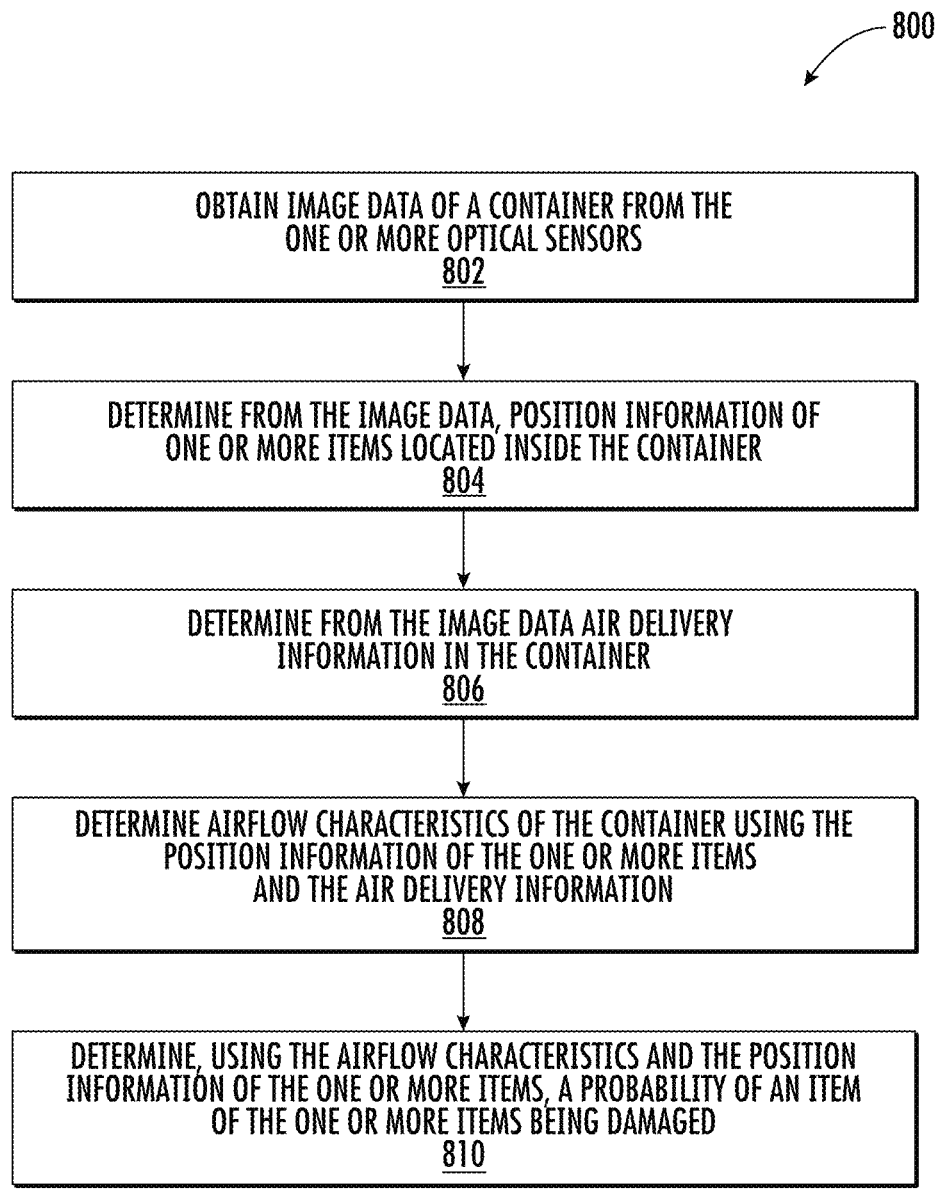
FIG. 8 shows a chart of a method for container condition determination, in accordance with one or more embodiments.

FIG. 8 Illustrates a method 800 for container condition determination, in accordance with one or more embodiments of the present disclosure. The operations of method 800 presented below are intended to be illustrative. In some implementations, method 800 may be accomplished with one or more additional operations not described and/or without one or more of the operations discussed. Additionally, the order in which the operations of method 800 are illustrated in FIG. 8 and described below is not intended to be limiting In some embodiments, the methods may be implemented in one or more processing devices (e.g., a digital processor, an analog processor, a digital circuit designed to process information, an analog circuit designed to process information, a state machine, and/or other mechanisms for electronically processing information). The processing devices may include one or more devices executing some or all of the operations of the methods in response to instructions stored electronically on an electronic storage medium. The processing devices may include one or more devices configured through hardware, firmware, and/or software to be specifically designed for execution of one or more of the operations of the method.

At an operation 802 of method 800, image data of a container from one or more optical sensors may be obtained. In some embodiments, operation 802 may be performed by an image module the same as or similar to image module 120 (shown in FIG. 1 and described herein).

At an operation 804 of method 800, position information of one or more items located inside the container may be determined based on the image data. In some embodiments, operation 804 may be performed by a parameter module, the same as or similar to parameter module 130 (shown in FIG. 1 and described herein).

At an operation 806 of method 800, air delivery information in the container may be determined from the image data. In some embodiments, operation 806 may be performed by a parameter module, the same as or similar to parameter module 130 (shown in FIG. 1 and described herein).

At an operation 808 of method 800, airflow characteristics of the container may be determined. The airflow characteristics of the container may be determined based on the position information of the one or more items and the air delivery information. In some embodiments, operation 808 may be performed by an air flow determination module, the same as or similar to air flow determination module 150 (shown in FIG. 1 and described herein).

At an operation 810 of method 800, a probability of an item of the one or more items being damaged is determined. In some embodiments, the probability of the item being damaged may be determined based on the position information and the airflow characteristics. In some embodiments, operation 810 may be performed by an analysis module, the same as or similar to analysis module 180 (shown in FIG. 1 and described herein).

Figure 9:
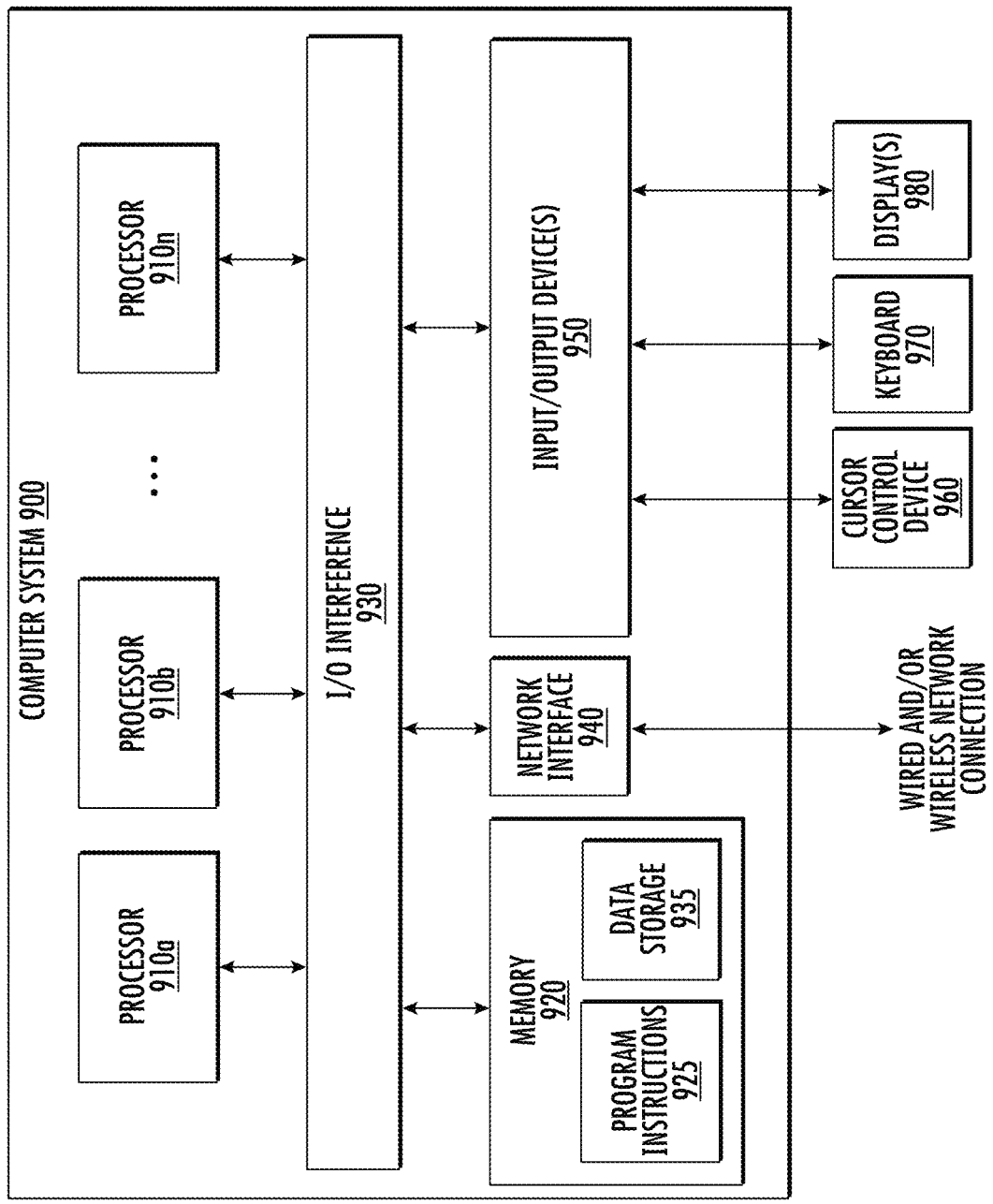
FIG. 9 shows an example of a computer system that may be used to implement aspects of the techniques described herein.

Embodiments of one or more techniques of container characterization as described herein may be executed on one or more computer systems, which may interact with various other devices. One such computer system 900 is illustrated by FIG. 9. FIG. 9 shows an example of a computer system that may be used to implement aspects of the techniques described herein. In different embodiments, computer system 900 may include any combination of hardware or software that can perform the indicated functions, including, but not limited to, a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or other type of computing or electronic device.

In the illustrated embodiment, computer system 900 includes one or more processors 910 coupled to a system memory 920 via an input/output (I/O) interface 930. Computer system 900 further includes a network interface 940 coupled to I/O interface 930, and one or more input/output devices 950, such as cursor control device 960, keyboard 970, and display(s) 980. In some embodiments, it is contemplated that embodiments may be implemented using a single instance of computer system 900, while in other embodiments multiple such systems, or multiple nodes making up computer system 900, may be configured to host different portions or instances of embodiments. For example, in one embodiment some elements may be implemented via one or more nodes of computer system 900 that are distinct from those nodes implementing other elements.

In various embodiments, computer system 900 may be a uniprocessor system including one processor 910, or a multiprocessor system including several processors 910 (e.g., two, four, eight, or another suitable number). Processors 910 may be any suitable processor capable of executing instructions. may be comprised of semiconductor(s) and/or transistors (e.g., electronic integrated circuits (ICs)). In such a context, processor-executable instructions may be electronically executable instructions. For example, in various embodiments, processors 910 may be general-purpose or embedded processors implementing any of a variety of instruction set architectures (ISAs), such as the x86, PowerPC, SPARC, or MIPS ISAs, or any other suitable ISA. In multiprocessor systems, each of processors 910 may commonly, but not necessarily, implement the same ISA.

In some embodiments, at least one processor 910 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the image processing methods disclosed herein may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others. In some embodiments, one or more computers may include multiple processors operating in parallel. A processor may be a central processing unit (CPU) or a special-purpose computing device, such as graphical processing unit (GPU), an integrated circuit or on-chip system, an application-specific integrated circuit (ASIC), a field-programmable gate array (FPGA), a complex programmable logic device (CPLD), or application-specific integrated circuits.

System memory 920 may be configured to store program instructions and/or data accessible by processor 910. In various embodiments, system memory 920 may be implemented using any suitable memory technology, such as static random-access memory (SRAM), synchronous dynamic RAM (SDRAM), nonvolatile/Flash-type memory, or any other type of memory. In the illustrated embodiment, program instructions and data implementing desired functions, such as those described in this disclosure, are shown stored within system memory 920 as program instructions 925 and data storage 935, respectively. In other embodiments, program instructions and/or data may be received, sent or stored upon different types of computer-accessible media or on similar media separate from system memory 920 or computer system 900. Generally speaking, a computer-accessible medium may include storage media or memory media such as magnetic or optical media, e.g., disk or CD/DVD-ROM coupled to computer system 900 via I/O interface 930. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 940.

In one embodiment, I/O interface 930 may be configured to coordinate I/O traffic between processor 910, system memory 920, and any peripheral devices in the device, including network interface 940 or other peripheral interfaces, such as input/output devices 950. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. In addition, in some embodiments some or all of the functionality of I/O interface 930, such as an interface to system memory 920, may be incorporated directly into processor 910.

Network interface 940 may be configured to allow data to be exchanged between computer system 900 and other devices attached to a network, such as other computer systems, or between nodes of computer system 900. In various embodiments, network interface 940 may support communication via wired or wireless general data networks, such as any suitable type of Ethernet network, for example, via telecommunications/telephony networks such as analog voice networks or digital fiber communications networks; via storage area networks such as Fibre Channel SANs, or via any other suitable type of network and/or protocol.

Input/output devices 950 may, in some embodiments, include one or more display terminals, cursor control devices (e.g., mouse), keyboards, keypads, touchpads, touchscreens, scanning devices, voice or optical recognition devices, or any other devices suitable for entering or retrieving data by one or more computer system 900. Multiple input/output devices 950 may be present in computer system 900 or may be distributed on various nodes of computer system 900. In some embodiments, similar input/output devices may be separate from computer system 900 and may interact with one or more nodes of computer system 900 through a wired or wireless connection, such as over network interface 940.

Those skilled in the art will appreciate that computer system 900 is merely illustrative and is not intended to limit the scope of the present disclosure. In particular, computer system 900 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

It should be understood that the description and the drawings are not intended to limit the invention to the particular form disclosed, but to the contrary, the intention is to cover all modifications, equivalents, and alternatives falling within the spirit and scope of the present invention as defined by the appended claims. Further modifications and alternative embodiments of various aspects of the invention will be apparent to those skilled in the art in view of this description. Accordingly, this description and the drawings are to be construed as illustrative only and are for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed or omitted, and certain features of the invention may be utilized independently, all as would be apparent to one skilled in the art after having the benefit of this description of the invention. Changes may be made in the elements described herein without departing from the spirit and scope of the invention as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device.

What is claimed is:

1. A system for container condition determination, the system comprising:
    one or more optical sensors;
    at least one processor; and
    memory storing instructions executable by the at least one processor, the instructions when executed cause the system to:
        obtain image data of a container from the one or more optical sensors;
        determine from the image data, position information of one or more items located inside the container;
        determine from the image data air delivery information in the container;
        determine airflow characteristics of the container using the position information of the one or more items and the air delivery information; and
        determine, using the airflow characteristics and the position information of the one or more items, a probability of an item of the one or more items being damaged.

2. The system of claim 1, wherein the instructions further cause the system to:
    determine a condition of one or more components of the container based on the image data of the container, the condition of the one or more components indicating presence or absence of damage to the one or more components; and
    determine a condition of the container based on condition of the one or more components.

3. The system of claim 1, wherein the instructions further cause the system to:
    determine a loading pattern of the container based on one or more of an orientation information or the position information of one or more items located inside the container.

4. The system of claim 3, wherein the instructions further cause the system to:
    determine thermal information for the container based on the image data; and
    generate one or more of a thermal simulation, an airflow simulation, or a loading pattern simulation based on one or more of the thermal, airflow, or loading information.

5. The system of claim 1, wherein the instructions further cause the system to:
    determine identification information of the one or more items, and wherein determining the probability of the item being damaged is further based on the identification information.

6. The system of claim 1, wherein the instructions further cause the system to:
    obtain, from sensors placed inside the container, environmental information inside the container; and
    determine a temperature control performance in the container based on the obtained environmental information; wherein determining the probability of the item being damaged is further based on the environmental information or the temperature control performance.

7. The system of claim 1, wherein the instructions further cause the system to:
    determine a condition of one or more components of the container based on the image data of the container, the condition of the one or more components is based on one or more of a physical, or thermal condition.

8. A method for container condition determination, the method being implemented in system comprising one or more optical sensors, at least one processor, and memory storing instructions, the method comprising:
    obtaining image data of a container from the one or more optical sensors;
    determining from the image data, position information of one or more items located inside the container;
    determining from the image data air delivery information in the container;
    determining airflow characteristics of the container using the position information of the one or more items and the air delivery information; and
    determining, using the airflow characteristics and the position information of the one or more items, a probability of an item of the one or more items being damaged.

9. The method of claim 8, further comprising:
    determining a condition of one or more components of the container based on the image data of the container, the condition of the one or more components indicating presence or absence of damage to the one or more components; and
    determining a condition of the container based on condition of the one or more components.

10. The method of claim 8, further comprising:
    determining a loading pattern of the container based on an orientation information or the position information of one or more items located inside the container.

11. The method of claim 10, further comprising:
    determining thermal information for the container based on the image data; and
    generating one or more of a thermal simulation, an airflow simulation, or a loading pattern simulation based on one or more of the thermal, airflow, or loading information.

12. The method of claim 8, further comprising:
    determining identification information of the one or more items, and wherein determining the probability of the item being damaged is further based on the identification information.

13. The method of claim 8, further comprising:
obtaining, from sensors placed inside the container, environmental information inside the container; and
determining a temperature control performance in the container based on the obtained environmental information; wherein determining the probability of the item being damaged is further based on the environmental information or the temperature control performance.

14. The method of claim 8, further comprising:
determining a condition of one or more components of the container based on the image data of the container, the condition of the one or more components is based on one or more of a physical, or thermal condition.

15. A non-transitory computer-readable storage medium storing program instructions, wherein the program instructions are computer-executable to implement:
obtaining image data of a container from the one or more optical sensors;
determining from the image data, position information of one or more items located inside the container;
determining from the image data air delivery information in the container;
determining airflow characteristics of the container using the position information of the one or more items and the air delivery information; and
determining, using the airflow characteristics and the position information of the one or more items, a probability of an item of the one or more items being damaged.

16. The non-transitory computer-readable storage medium of claim 15, wherein the program instructions are computer-executable to implement:
determining a condition of one or more components of the container based on the image data of the container, the condition of the one or more components indicating presence or absence of damage to the one or more components; and
determining a condition of the container based on condition of the one or more components.

17. The non-transitory computer-readable storage medium of claim 15, wherein the program instructions are computer-executable to implement:
determining a loading pattern of the container based on the position information of one or more items located inside the container.

18. The non-transitory computer-readable storage medium of claim 17, wherein the program instructions are computer-executable to implement:
determining thermal information for the container based on the image data; and
generating one or more of a thermal simulation, an airflow simulation, or a loading pattern simulation based on one or more of the thermal, airflow, or loading information.

19. The non-transitory computer-readable storage medium of claim 15, wherein the program instructions are computer-executable to implement:
obtaining, from sensors placed inside the container, environmental information inside the container; and
determining a temperature control performance in the container based on the obtained environmental information; wherein determining the probability of the item being damaged is further based on the environmental information or the temperature control performance.

20. The non-transitory computer-readable storage medium of claim 15, wherein the program instructions are computer-executable to implement:
determining a condition of one or more components of the container based on the image data of the container, the condition of the one or more components is based on one or more of a physical, thermal, or seal condition.

* * * * *